(12) United States Patent
Crittenden et al.

(10) Patent No.: US 6,871,673 B2
(45) Date of Patent: Mar. 29, 2005

(54) MULTI-EDGED CUTTER

(75) Inventors: David E. Crittenden, Schaumburg, IL (US); Janusz Figiel, Mundelien, IL (US)

(73) Assignee: Illinois Tool Works, Inc., Glenview, IL (US)

(*) Notice: Subject to any disclaimer, the term of this patent is extended or adjusted under 35 U.S.C. 154(b) by 203 days.

(21) Appl. No.: 10/384,955

(22) Filed: Mar. 10, 2003

(65) Prior Publication Data

US 2004/0177892 A1 Sep. 16, 2004

(51) Int. Cl.[7] .................................................. B21F 9/02
(52) U.S. Cl. ........................................ 140/152; 83/955
(58) Field of Search ............................ 140/93.2, 123.6, 140/152; 100/29; 83/955

(56) References Cited

U.S. PATENT DOCUMENTS

| | | | |
|---|---|---|---|
| 5,097,874 A | * | 3/1992 | Bobren ...................... 140/93.2 |
| 5,499,664 A | | 3/1996 | Figiel et al. |
| 5,848,621 A | | 12/1998 | Cheung |
| 6,640,838 B2 | * | 11/2003 | Finzo ........................ 140/93.2 |

* cited by examiner

Primary Examiner—Lowell A. Larson
(74) Attorney, Agent, or Firm—Mark W. Croll, Esq.; Donald J. Breh, Esq.; Welsh & Katz, Ltd.

(57) ABSTRACT

A cutting mechanism for use with a strapping tool includes a cutter having a polygonal cross-sectional configuration, a plurality of cutting surfaces defining a pair of elongate cutting edges, and a plurality of retaining recessed. The cutting edges are an in-use edge and a spare edge. The cutter is engaged with a movable die holder having a support surface for the cutting body. The holder includes a slot defining a plurality of projections. The projections are configured so that the retaining recesses of the cutter fit within the support surface slot. The cutter is reversible on the die holder such that the in-use and spare cutting edges are interchangeable by rotation of the cutter.

11 Claims, 2 Drawing Sheets

MULTI-EDGED CUTTER

BACKGROUND OF THE INVENTION

The present invention is directed to a multi-edged cutting mechanism for use with strapping tools. More particularly, the present invention pertains to a multi-edged cutting mechanism having cutting surfaces defining elongate cutting edges, retaining surfaces, and a movable die holder with a slot defining tabs having a support surface for the cutting body.

It is desirable to provide multi-edged cutters for, portable or hand-held strapping tools so that when one cutting edge wears out, a replacement is immediately available. Examples of multi-edge cutters include the triple edged cutters of U.S. Pat. Nos. 5,499,664 and 5,848,621.

Typically, cutters provide a single cutting edge, which moves up and down with the motion of a holder. One such strapping tool, commercially available from ITW SIGNODE CORPORATION of Glenview, Ill., attaches a single-edged cutter to a die holder with a pin. On the downstroke, i.e., the cutting stroke, a cutter support surface on the die holder forces the cutting edge through a strap. On the up stroke, the attaching pin pulls the cutter back up.

Cutters that provide multiple cutting edges, such as the cutters described in the above-cited patents, frequently require separate cutting holders and include return springs to return the cutter during the upstroke. In addition to unnecessarily complicating cutter function, the more parts that are required, the greater the opportunity for malfunction or breakage.

Accordingly, there exists a need for a multi-edged cutting mechanism that provides a simple means of connecting the cutting surfaces and edges to the rest of the cutting mechanism. Such a cutting mechanism reduces the number of parts and conveniently provides at least one immediately available replacement cutter. It also protects the cutting edges not in use from any damage.

BRIEF SUMMARY OF THE INVENTION

A cutting mechanism for use with a strapping tool includes a cutter having a polygonal cross-sectional configuration, cutting surfaces defining elongate cutting edges, and retaining recesses formed in a body of the cutter. The cutting edges are an in-use edge and a spare edge.

The mechanism includes a movable die holder having a support surface for supporting the cutter body. The support surface includes projections extending outwardly therefrom for supporting the cutter. The cutter is reversible on the die holder such that the in-use and spare cutting edges are interchangeable by rotation of the cutter.

A slot is defined between the projections such that a central portion of the cutter body (between the recesses) fits within the support surface slot. The cutter is reversible about the projections.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
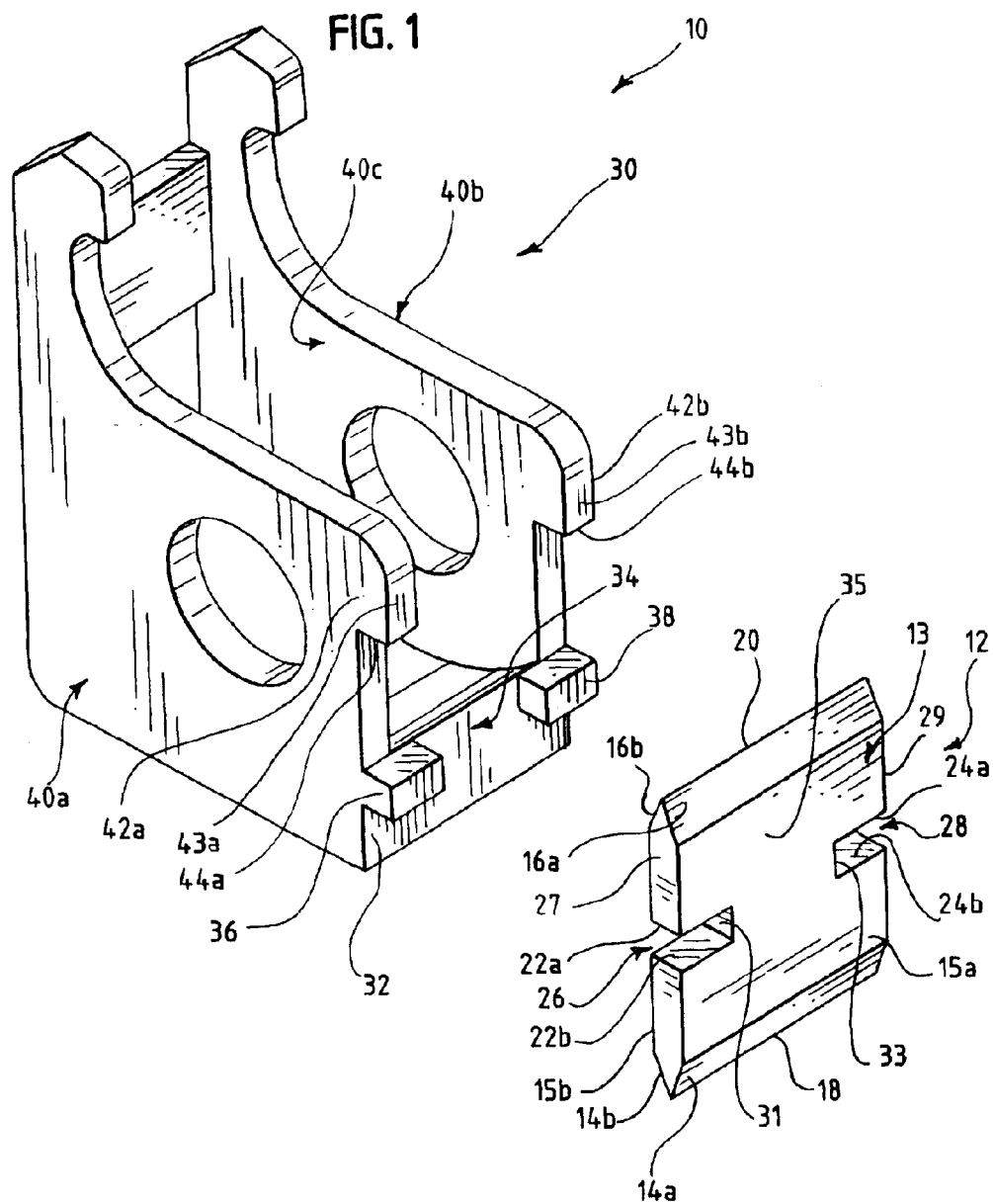
FIG. 1 is a perspective view of a multi-edged cutting mechanism for use with strapping tools embodying the principles of the present invention, the cutter being shown removed from the cutting mechanism.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular to FIG. 1, there is shown generally a cutting mechanism 10 for use with strapping tools, in accordance with the principles of the present invention. The cutting mechanism includes a die holder 30 and a cutter 12. The cutter 12 has a body portion 13 having a polygonal cross-sectional configuration that defines first and second laterally opposed cutting surfaces 14a,b, and 16a,b respectively, at each end. The cutting surfaces 14a,b and 16a,b define first and second elongate, parallel cutting edges 18, 20 respectively. The body 13 has first and second (or front and rear) generally parallel surfaces 15a,b that extend between the cutting surfaces 14a,b and 16a,b.

The body 13 further defines first and second laterally opposed recesses or notches 26, 28 formed therein. The recesses 26, 28 are disposed such that the cutting edges 18, 20 are symmetrically disposed thereabout. That is, the edges 18, 20 are mirror images of each other relative to the recesses 26, 28. In a present embodiment, the recesses 26, 28 are formed as rectangular notches in longitudinal sides 27, 29 of the body 13. The notches 26, 28 define inner walls 31, 33 at their closest-most locations.

The recesses 26, 28 each define first and second laterally opposed retaining surfaces 22a,b and 24a,b, respectively. In a current embodiment, the cutting edges 18, 20 and retaining surfaces 22a,b, 24a,b are parallel to one another. The retaining surfaces 22a,b and 24a,b are perpendicular to the longitudinal sides edges 27, 29.

The movable die holder 30 is supported by the strapping tool and has a support surface 32, against which a lower portion of the cutter 12 rests. A two-part projection or shoulder 36, 38 extends outwardly from the surface 32 for engaging the cutter 12. The two-part projection 36, 38 defines a slot 34 therebetween within which the central portion 36 of the cutter body 13 (between the notches 26, 28) is positioned. In a current embodiment, the slot 34 is centrally located along the support surface 32. The projections 36, 38 are configured so that the recesses 26, 28 of the cutter 12 fit over the projections 36, 38, and so that the cutter 12 is laterally held in place by the projections 36, 38 abutting the notch inner walls 31, 33.

As seen in FIG. 1, an upper portion of the holder is formed having parallel, upstanding spaced apart walls 40a,b spaced from one another. The space 40c between the walls 40a,b is configured for receipt of a shaft, cam and sealer arrangement (not shown) for forming a seal in the strap material. To this end, the upper portion of the holder, at a corresponding upper portion of the cutter is formed as two walls (indicated generally at 42a,b), the edges of which bear the cutter 12 when it is in position on the holder 30. Lip 44a,b are formed at an uppermost region of each of the walls 40a,b to define surfaces 43a,b which facilitate guiding the holder 30 in the strapper tool base (not shown).

Figure 2:
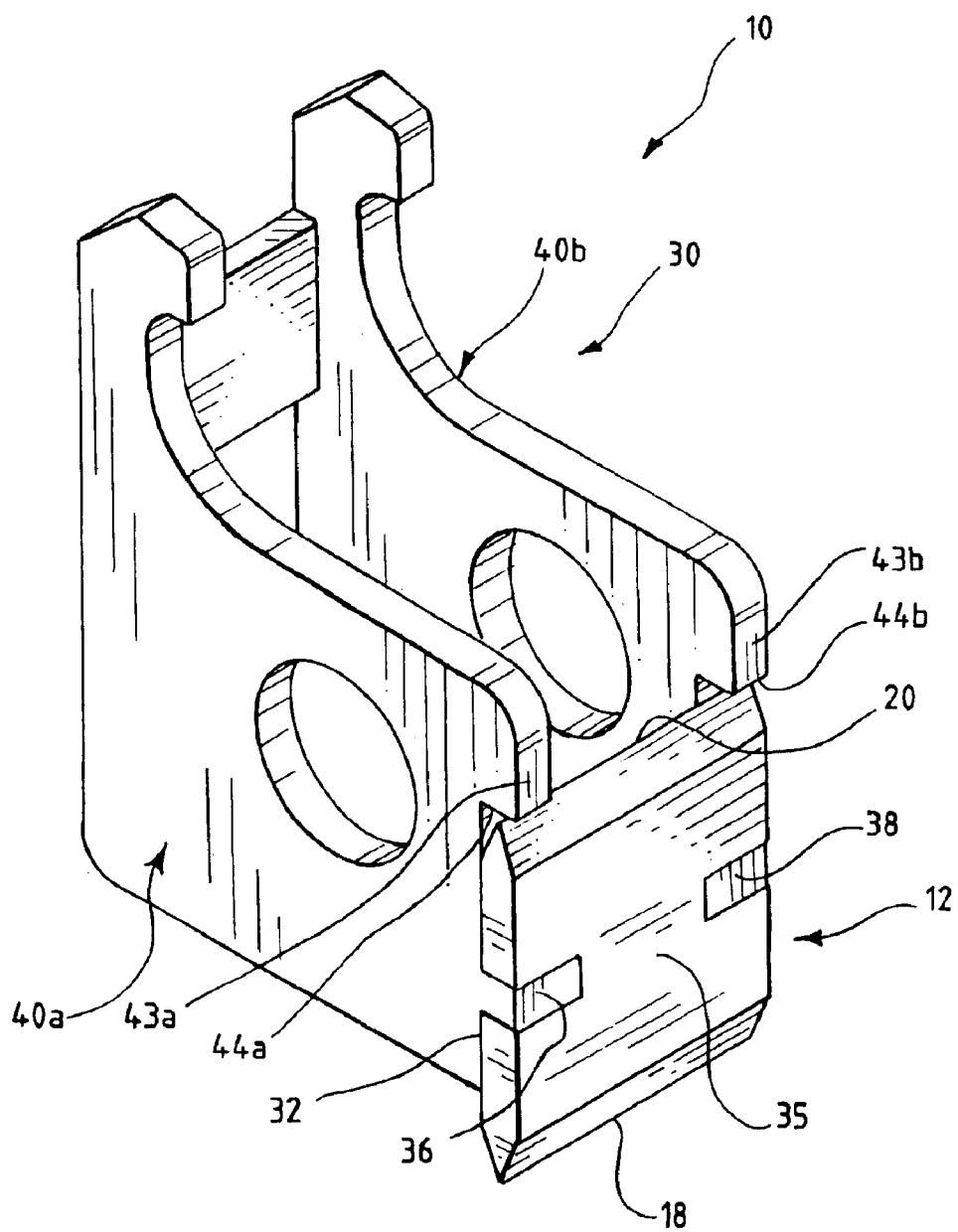
FIG. 2 is a perspective view of the cutting mechanism similar to FIG. 1, showing the cutter engaged with the die holder.

Referring now to FIG. 2, the cutter 12 is shown engaged to the die holder 30. The cutter 12 and die holder 30 move up and down together to perform strap cutting functions. On the downstroke, the projections 36, 38 force the cutter 12 down, and thus the first cutting edge 18 through a strap. On the upstroke, the projections 36, 38 lift the cutter 12, and maintain an appropriate spacing so that the second cutting edge 20, which is not in use, does not sustain any damage, as by contacting the upper wall lips 44a,b. No return arrangement other than the upward urging of the projections 36, 38 of the holder 30 acting on the cutter 12 are required.

When the first cutting edge 18 wears out, replacement of the spent edge is readily carried out. The cutter 12 is removed from the die holder 30 and is "flipped", reversing the spent edge 18 with the second or spare cutting edge 20. The cutter 12 is replaced in the die holder 30, so that the recesses 26, 28 once more fit over the projections 36, 38, and the strapping tool is again ready to use.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A cutting mechanism for use with a strapping tool, comprising:
    a movable die holder mounted to the strapping tool, the die holder having a support surface, the die holder including a plurality of projections extending outwardly therefrom, at least some of the projections being in opposing relation to others of the projections and defining a slot between the opposing projections;
    a cutter defining a body portion having a polygonal cross-sectional configuration, the cutter having a pair of opposing, mirror image cutting surfaces on opposing ends thereof defining an in-use and a spare elongate cutting edge, the cutter body having recesses formed in longitudinal sides of the body portion, the cutter configured for receipt on the die holder support surface and engagement with the die holder projections,
    wherein the cutter is reversible on the die holder such that the in-use and spare cutting edges are interchangeable by rotation of the cutter.

2. The cutting mechanism in accordance with claim 1 wherein the plurality of cutting surfaces are first and second surfaces laterally opposed to each other, defining the in-use and spare elongate, parallel cutting edges.

3. The cutting mechanism in accordance with claim 1 wherein the recesses are formed as first and second laterally opposed, mirror image recesses, centrally located along the longitudinal sides.

4. The cutting mechanism in accordance with claim 3 wherein the first and second opposed recesses define a central portion of the cutter body therebetween.

5. The cutting mechanism in accordance with claim 1 wherein the die holder support surface slot is configured for receipt of the cutter body central portion.

6. The cutting mechanism in accordance with claim 1 wherein the die holder support surface slot is centrally located.

7. The cutting mechanism in accordance with claim 1 wherein the die holder includes a lip defining a recess between the lip and the projections for receipt of a portion of the cutter.

8. A cutter for use with a strapping tool, the cutter configured for receipt in a die holder mounted to the strapping tool, the cutter comprising:
    a body portion having a polygonal cross-sectional configuration, the cutter having opposing, mirror image cutting surfaces defining a pair of opposing, mirror image elongate cutting edges, pair being an in-use cutting edge and a spare cutting edge, the cutter having a plurality of retaining notches formed therein to secure the body portion with the die holder surfaces, the cutter being reversible on the die holder such that the in-use and spare cutting edges are interchangeable by rotation of the cutter.

9. The cutter in accordance with claim 8 wherein the plurality of retaining notches is formed as first and second laterally opposed recesses centrally located in opposing longitudinal sides of the body portion.

10. The cutter in accordance with claim 9 wherein the notches are formed as rectangular recesses in the longitudinal sides and define a central portion of the body therebetween.

11. The cutter in accordance with claim 10 wherein the rectangular recesses are centrally located.

* * * * *